United States Patent
Lee et al.

(10) Patent No.: US 10,696,835 B2
(45) Date of Patent: *Jun. 30, 2020

(54) POLYMER COMPOSITION FOR INSULATION LAYER OF POWER CABLE, INSULATION LAYER INCLUDING THE SAME AND POWER CABLE INCLUDING THE SAME

(71) Applicant: Huinnovation Co., Ltd., Seongnam-si, Gyeonggi-do (KR)

(72) Inventors: Dong Kwon Lee, Seongnam-si (KR); Moon Seok Lee, Sejong-si (KR); Yong Rae Cho, Daejeon (KR)

(73) Assignee: HUINNOVATION CO., LTD., Seongnam-si (KR)

( * ) Notice: Subject to any disclaimer, the term of this patent is extended or adjusted under 35 U.S.C. 154(b) by 117 days.

This patent is subject to a terminal disclaimer.

(21) Appl. No.: 16/123,800

(22) Filed: Sep. 6, 2018

(65) Prior Publication Data

US 2019/0185651 A1    Jun. 20, 2019

(30) Foreign Application Priority Data

Dec. 19, 2017  (KR) ........................ 10-2017-0174790

(51) Int. Cl.
*C08L 23/16*   (2006.01)
*C08L 23/12*   (2006.01)
*H01B 3/30*    (2006.01)
*H01B 3/44*    (2006.01)

(52) U.S. Cl.
CPC .............. *C08L 23/16* (2013.01); *C08L 23/12* (2013.01); *H01B 3/307* (2013.01); *H01B 3/441* (2013.01); *C08L 2203/202* (2013.01); *C08L 2205/02* (2013.01); *C08L 2205/22* (2013.01)

(58) Field of Classification Search
CPC ........ C08L 23/142; C08L 23/12; C08L 12/16; C08L 2201/02; C08L 2207/02; C08L 2205/22; C08L 2203/202; C08L 2205/02; C08K 5/09; C08K 5/5419; C08K 3/016; C08F 210/16; C08F 210/06; C08F 2800/20; H01B 3/307; H01B 3/441

See application file for complete search history.

(56) References Cited

U.S. PATENT DOCUMENTS

| | | | |
|---|---|---|---|
| 9,969,871 B2 * | 5/2018 | Lee et al. | ................ C08L 23/12 |
| 2005/0170118 A1 * | 8/2005 | Cleveland et al. | ....... B32B 1/08 |
| | | | 428/36.91 |
| 2009/0211782 A1 | 8/2009 | Perego et al. | |
| 2013/0025909 A1 | 1/2013 | Perego et al. | |
| 2017/0349738 A1 * | 12/2017 | Chiba et al. | ................ C08J 3/22 |
| 2019/0185648 A1 * | 6/2019 | Lee et al. | ............. C08L 23/142 |

FOREIGN PATENT DOCUMENTS

| | | |
|---|---|---|
| KR | 10-2014-0134836 A | 11/2014 |
| WO | WO 2007/118659 A1 | 10/2007 |
| WO | WO 2010/059425 A1 | 5/2010 |

* cited by examiner

*Primary Examiner* — Nathan M Nutter
(74) *Attorney, Agent, or Firm* — Birch, Stewart, Kolasch & Birch, LLP

(57) ABSTRACT

Disclosed is an eco-friendly polymer composition for an insulation layer of power cables having a morphology in which a second phase substance of polypropylene composite is dispersed in a first phase substance of polypropylene, wherein the polypropylene composite of the second phase substance has a morphology in which an at least partially cured elastomer is dispersed as a filler in a matrix of polypropylene.

7 Claims, 2 Drawing Sheets

[FIG. 1]
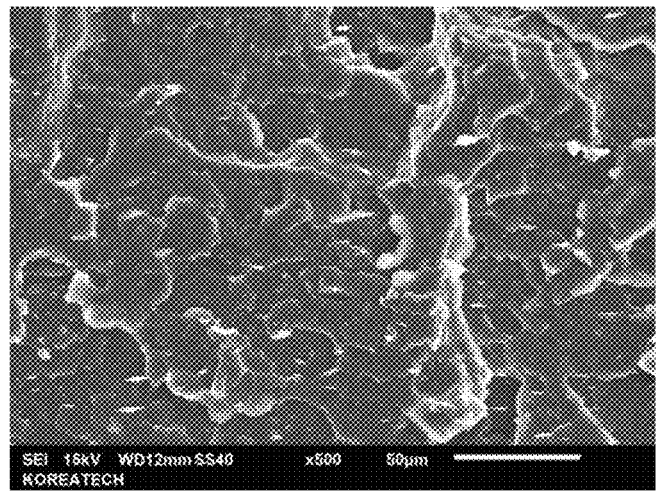
[FIG. 2]
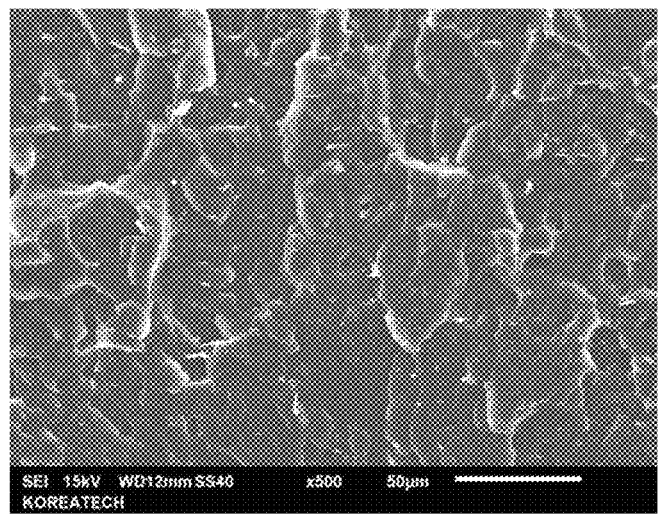

[FIG. 3]
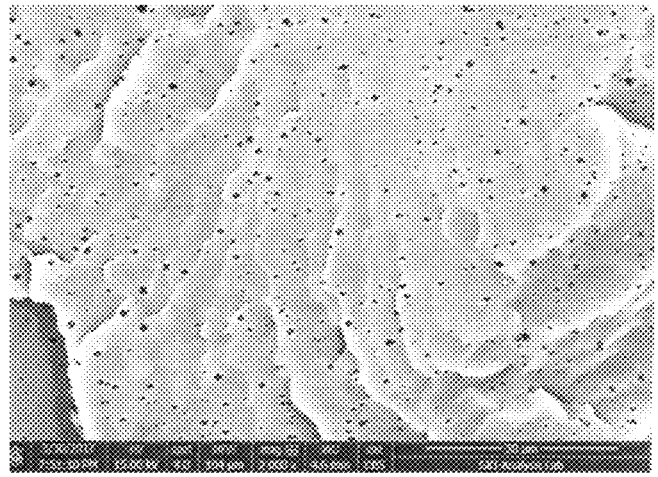

POLYMER COMPOSITION FOR INSULATION LAYER OF POWER CABLE, INSULATION LAYER INCLUDING THE SAME AND POWER CABLE INCLUDING THE SAME

TECHNICAL FIELD

The present invention relates to an eco-friendly polymer composition for an insulation layer of power cables that exhibits electrical, mechanical and thermal properties required for the insulation layer of power cables and, due to a new morphology thereof, provides flexibility, bendability, impact resistance and the like, and furthermore has considerably improved remoldability (reformability) for recycling of materials.

BACKGROUND ART

In modern society, increased electricity demand has brought about increased demand for power cables. In response to this trend, power cables to transport high-capacity power have been actively developed.

In general, a power cable includes a conductor and an insulation layer surrounding the conductor. A high- or super-high-voltage cable may further include an inner semiconductor layer between the conductor and the insulation layer, an outer semiconductor layer surrounding the insulation layer, a sheath layer surrounding the outer semiconductor layer, and the like. The power cable is a consumable product which is used for a given period of time and then disposed. As conventional insulation materials for power cables, crosslinked substances of polyolefin-based polymers such as polyethylene, ethylene/propylene elastomeric copolymers (ethylene/propylene rubbers, EPR) and ethylene/propylene/diene copolymers (EPDM) that have excellent mechanical and electrical properties are generally used.

However, in order to recycle copper (Cu) and aluminum (Al), which are conductors of cables which occupy most of production cost, it is necessary to remove insulation layers that fail to satisfy requirements after production of cables or insulation layers of used cables. However, crosslinked polyethylene (crosslinked PE:XLPE) used as an insulation layer is removed by incineration upon disposal of used cables because reforming (remolding) of XLPE is impossible. At this time, a great amount of $CO_2$ is generated and the burned ash should be buried in landfill, which causes an environmental problem. In addition, so as to produce XLPE cables, a crosslinkage process at high temperature and at high pressure (for example, about 300° C., 7 atm or the like) is required after cable forming (molding). For this purpose, several tens of meters or more of curing tubes should be introduced, which requires considerable production facility site and power costs. Furthermore, addition of expensive chemical substances (crosslinking agents or the like) is necessary for crosslinkage, which disadvantageously results in increased production costs and waste of resources.

Accordingly, a variety of attempts to solve these problems have been made. Some prior art suggests use, as an insulation material, of a composition in which propylene copolymer particles are dispersed in polypropylene as a matrix. In accordance with this technology, an eco-friendly polypropylene resin is used because the polypropylene matrix has a melting point of 150° C. or higher and thus provides excellent heat resistance even without crosslinkage. In addition, in order to improve insufficient flexibility, bendability and the like, which are drawbacks of the polypropylene resin, a composition in which a propylene copolymer having a predetermined mean weight particle size is dispersed in the polypropylene matrix is used as an insulation material. Cable products can be manufactured immediately after molding (forming) cables, without an additional crosslinkage process, which causes considerable reduction of production costs and enables insulation layers that fail to satisfy requirements after production of cables to be recycled by separating and then reforming the insulation layers.

However, the composition has insufficient flexibility and bendability, for example, undergoes a phenomenon, called "stress whitening (blush)", upon bending of power cables or application of external mechanical stress and tension.

In addition, there is a limitation of low remoldability due to high melting point or the like during a reforming process to recycle used power cables or defective power cable products.

Accordingly, there is an increasing need for polymer compositions for an insulation layer of power cables that satisfy basic properties such as flexibility and bendability comparable to XLPE such that the polymer compositions can replace XLPE, and has excellent remoldability.

DISCLOSURE

Technical Problem

Therefore, the present invention has been made to solve the above and other technical problems that have yet to be resolved.

As described later, the present invention is completed based on the finding that, since the polymer composition for an insulation layer of power cables according to the present invention has a morphology in which a second phase substance of polypropylene composite having a certain morphology is dispersed in a first phase substance of polypropylene, it can provide excellent flexibility and bendability upon bending of power cables or application of external mechanical stress and tension, and in particular, can provide excellent remoldability (reformability) for recycling or reuse of materials.

Technical Solution

In accordance with one aspect of the present invention, provided is a polymer composition for an insulation layer of power cables having a morphology in which a second phase substance of polypropylene composite is dispersed in a first phase substance of polypropylene, wherein the polypropylene composite of the second phase substance has a morphology in which an at least partially cured elastomer is dispersed as a filler in a matrix of propylene.

That is, the polymer composition according to the present invention can provide excellent elasticity as compared to conventional fillers (dispersed phase) and thus impart a desired level of elasticity to power cables, because the filler dispersed in the matrix in the polypropylene composite of the second phase substance includes an elastomer.

In addition, the polypropylene of the first phase substance and the polypropylene matrix of the second phase substance include the same polymer, i.e., polypropylene, thus providing considerably excellent compatibility. That is, since there is excellent compatibility between the first and second phases, and a great amount of filler with a considerably small particle diameter dispersed in the second phase is distributed, flexibility and bendability are considerably superior due to excellent elasticity of dispersed phase fillers.

As a result, it is possible to considerably reduce the phenomenon of stress whitening (blush) upon bending of power cables or application of external mechanical stress and tension.

Furthermore, since a cured filler having a dispersed phase is present in a considerably small size in the matrix polypropylene of the second phase, although the dispersed-phase filler is cured, it shows similar behaviors to flowability of the matrix polypropylene and thus provides excellent remoldability upon melting for recycling or reuse.

Effects of the Invention

As described above, the polymer composition for an insulation layer of power cables according to the present invention has a morphology in which a second phase substance of polypropylene composite having a certain morphology is dispersed in a first phase substance of polypropylene, thus providing excellent flexibility and bendability upon bending of power cables or application of external mechanical stress and tension, and in particular, excellent remoldability (reformability) for recycling or reuse of materials.

BRIEF DESCRIPTION OF THE DRAWINGS

The above and other objects, features and other advantages of the present invention will be more clearly understood from the following detailed description taken in conjunction with the accompanying drawings, in which:

FIG. 1 is an SEM image showing results of an elution test of Example 1;

FIG. 2 is an SEM image showing results of an elution test of Example 2; and

FIG. 3 is an SEM image showing results of an elution test of Comparative Example 1.

BEST MODE

In a specific embodiment, the polypropylene of the first phase substance and the polypropylene of the second phase substance may be partially or fully (entirely) mixed at the interface therebetween. Preferably, the polypropylene of the first phase substance is fully (entirely) mixed with the polypropylene of the second phase substance at the interface therebetween, thus providing excellent flexibility and bendability, and superior remoldability.

The polypropylene of the first phase substance and the polypropylene of the second phase substance may be, preferably, homo-polypropylene, which is a single polymer of propylene, or in some cases, be a polymer based on a combined monomer further including a small amount of other monomer, in addition to propylene. Here, the homo-polypropylene means polypropylene including a propylene monomer in an amount of at least 98% by weight, preferably 99% by weight or more, most preferably 99.5% by weight. Meanwhile, the combined monomer may include a monomer selected from ethylene and $C_4$ to $C_8$ α-olefin, for example, 1-butene, 1-pentene, 4-methyl-1-pentene, 1-hexene, 1-octene and a combination thereof. This monomer may be added in an amount of not more than 10% by weight in total to synthesize the polymer.

For example, the polypropylene may have a molecular weight of 10,000 to 900,000, based on number average molecular weight, and the molecular weight of the polypropylene of the first phase substance may be the same as or different from the molecular weight of the polypropylene of the second phase substance. When the polypropylene of the first phase substance and the polypropylene of the second phase substance have the same or similar molecular weights, better miscibility can be provided at the interface between the first and second phase substances. Although the first and second phase substances have different molecular weights, the difference in molecular weight therebetween is preferably 40% or less so as to provide at least partial mixing.

A ratio of the first phase substance to the second phase substance is preferably 1:9 to 5:5 on a weight basis. When the ratio is not within the range, it may difficult to exert effects of physical properties desired by the present invention.

In a specific embodiment, the elastomer, which is a dispersed-phase of the second phase substance, may be an EPDM rubber (ethylene propylene diene monomer rubber). The EPDM rubber may include EPDM in an amount of 60% or more, preferably 70% or more, based on the total weight. In the preparation process, some of polypropylene, process oil, clay, ZnO, calcium stearate (Ca-st), wax or the like may be added.

The EPDM rubber may be partially or fully cured. The curing of EPDM rubber is determined by a crosslinking rate of diene units contained in EPDM. A crosslinking rate of 10% to 60% may be determined as "partial cured" and a crosslinking rate of more than 60% may be determined as "full cured". The dispersed-phase filler is preferably fully cured, because full curing provides better mechanical properties including elasticity than partial curing.

The curing of EPDM rubber is carried out in the process of preparing the second phase substance as described below.

In a specific embodiment, the second phase substance may include a dispersed-phase elastomer and polypropylene as a matrix in a weight ratio of 6:4 to 9:1 (elastomer: polypropylene) and may further include clay, wax, a crosslinking agent, a crosslinking aid, $TiO_2$, a process oil or the like in an amount of 40% or less, based on the total weight of the second phase substance in the process of preparing the same.

As described above, the elastomer acting as a dispersed-phase filler in the second phase substance has a considerably small particle diameter, for example, a mean particle diameter of 30 Å to 100 Å. When the mean particle diameter is excessively large, it may be difficult to sufficiently provide properties of polypropylene as the matrix due to the elastomer present as a main ingredient in the second phase substance. Accordingly, a smaller mean particle diameter provides advantages in terms of various physical properties such as elasticity, but entails considerable difficulty in production. Thus, the mean particle diameter is preferably within this range defined above.

In a specific embodiment, the polymer composition according to the present invention can be prepared by blending the first phase substance and the second phase substance, which are separately prepared. As such, a unique morphology defined by the present invention can be imparted to the polymer composition, since the polymer composition is prepared by separately preparing the first phase substance and the second phase substance and then blending the first phase substance with the second phase substance.

For example, a process of preparing a second phase substance in which the elastomer is an EPDM rubber will be described below.

First, EPDM and polypropylene are added in a predetermined ratio (for example, 80 wt % or more of EPDM) to a kneader, a process oil, clay, ZnO, calcium stearate, wax or the like are added thereto, a jacket temperature is elevated to 180° C. or more, and these ingredients are mixed for a predetermined period of time and then dumped and produced into pellets in an extruder. The moisture left after pelletization is removed and the pellets are surface-treated in a tumbler to prevent adherence between EPDM master batches and thereby to produce final EPDM master batches. At this time, when the kneader temperature is higher than 200° C., color change occurs. Thus, the kneading is preferably carried out at about 190° C. for a kneading time of 20 minutes or less, to prevent color change. The processing time in the tumbler is preferably sufficient, i.e., 10 minutes or longer, to prevent agglomeration between pellets.

Then, the EPDM master batches and polypropylene are mixed with a crosslinking agent or the like in a predetermined ratio in a twin-screw extruder, the resulting mixture is added through a feeder and then a crosslinking aid or the like is added in the middle of the extruder through a side feeder, if necessary, a process oil and the like is added in the middle of the extruder through a liquid feeder and then extrusion is conducted. In this case as well, the extruder temperature is preferably 200° C. or less.

In this preparation process, the EPDM master batch is cured while maintaining the filler shape in the polypropylene matrix and then converted into EPDM rubber. Depending on the type of crosslinking agent, curing degree can be determined. For example, when a peroxide-based crosslinking agent is used, partial curing is carried out and, when a phenol resin-based crosslinking agent is used, full curing is carried out.

The second phase substance thus prepared is blended with the first phase substance to prepare the composition of the present invention.

The present invention also provides a cable insulation layer including the polymer composition and a power cable produced from the cable insulation layer.

The polymer composition may be present in the cable insulation layer in an amount of 15% by weight or more, based on the total weight of the power cable insulation layer. When the polymer composition is present in an amount of less than 15% by weight, the power cable insulation layer cannot accomplish the desired effects of the present invention. Preferably, the polymer composition is present in an amount of 25% by weight or more, more preferably 30% by weight or more.

There is no limitation as to type of polymer or the like other than the polymer composition that may be included in the power cable insulation layer so long as it can constitute a cable insulation layer that satisfies effects to be accomplished by the present invention, that is, is eco-friendly, recyclable and remoldable, while maintaining thermal, electrical and functional properties.

In a specific embodiment, the polymer that can be included in the power cable insulation layer may be a thermoplastic polymer, for example, polyethylene. The added polyethylene may change mechanical properties of the cable insulation layer. For example, when impact strength and resistance to ductility or the like needs to be further improved, this can be accomplished by incorporation of suitable polyethylene.

If necessary, the polymer composition may further include one or more other additives selected from the group consisting of an insulation oil, an antioxidant, an impact modifier, a flame retardant agent, a heat stabilizer, a nucleating agent and an acid scavenger.

In general, a power cable includes a conductor and an insulation layer surrounding the conductor. A high- or super-high-voltage cable may further include an inner semiconductor layer between the conductor and the insulation layer, an outer semiconductor layer surrounding the insulation layer, a sheath layer surrounding the outer semiconductor layer, and the like. The present invention provides an insulation layer, as an insulation material, including the polymer composition according to the present invention and a power cable including the insulation layer.

Best Mode

Now, the present invention will be described in more detail with reference to examples and the like. These examples should not be construed as limiting the scope of the present invention.

Example 1

An oil-containing EPDM (Mooney viscosity: (1+4, 125° C.) 53, ethylene content: 70 wt %, ENB content: 5.7 wt %, oil content: 50 phr) and homo-polypropylene were added in a ratio (weight ratio) of 5:1 to a kneader, mixed at a temperature of 190° C. for 15 minutes and then pelletized in an extruder. At this time, the extruder temperature was 170 to 210° C. and the die temperature was 260° C. The pellets were treated with Ca-st in a tumbler for 15 minutes to prevent adhesion therebetween.

80 wt % of the EPDM pellets thus prepared, 3.5 wt % of homo-polypropylene, 0.3 wt % of a crosslinking agent and 0.9 wt % of a crosslinking aid were dry-blended and the reaction blend was then extruded in a 40 mm twin screw extruder (L/D=40). In the middle of the extruder, 10 wt % of homo-polypropylene was further added and at the end of the extruder, 5.3 wt % of a process oil was added with a liquid pump. At this time, the extruder temperature was 160° C.-180° C.-185° C.-190° C.-190° C.-195° C., the screw rate was maintained at 300 rpm, and adaptor and die temperatures were 190° C. Pellets were produced by die face cutting and then dehumidification-dried before use.

35 wt % of the finished pellets and 65 wt % of homo-polypropylene were added to a 40 mm twin screw extruder and produced into pellets. At this time, the extrusion temperature was 150° C.-180° C.-190° C.-210° C.-220° C.-220° C., the die temperature was 210° C., and die face cutting was conducted. The pellets were molded into sheets at 210° C. at a pressure of 15 tons for 3 minutes.

A sheet with a thickness of 1 mm was used to measure tensile strength, elongation and SEM, a sheet with a thickness of 3 mm was used to measure flexural strength, and a sheet with a thickness of 250 um was used to measure AC dielectric breakdown voltage.

Example 2

25 wt % of pellets produced in the same conditions and manners as in Example 1 and 75 wt % of homo-polypropylene were pelletized in the same manner as in Example 1, and sheets with thicknesses of 250 um, 1 mm, and 3 mm were then produced and analyzed.

Comparative Example 1

35 wt % of commercially available TPO (Lyondellbasell Industries N.V., CA7441A) and 65 wt % of homo-polypropylene were pelletized in the same conditions and manners as in Example 1 and sheets with thicknesses of 250 um, 1 mm, and 3 mm were then produced and analyzed.

Tensile strength test and elongation test were conducted in accordance with ASTM-D634 using a UTM apparatus.

Flexural strength test was conducted in accordance with ASTM-D790 using a UTM apparatus.

AC dielectric breakdown voltage test was conducted in accordance with ASTM-D149, an electrode made of stainless steel was used, the diameter of the electrode was 6.4 mm, and the radius of curvature at the end thereof was 0.8 mm.

Test results are shown in the following Table 1 and FIGS. 1 to 3.

TABLE 1

|  | Example 1 | Example 2 | Comparative Example 1 |
|---|---|---|---|
| Tensile strength (N/mm²) | 42 | 39 | 30 |
| Elongation (%) | 960 | 920 | 820 |
| Flexural strength (kgf/cm²) | 2600 | 3000 | 3900 |
| AC dielectric breakdown voltage (kV) | 35.94 | 33.30 | 32.62 |

First, as can be seen from FIGS. 1 to 3, SEM analysis results showed that Comparative Example 1 had a heterogeneous phase, while Examples 1 and 2 had considerably high miscibility, which indicated that they had different overall morphologies.

Accordingly, as can be seen from Table 1 above, as compared to Comparative Example 1, Examples 1 and 2 had excellent compatibility between the first and second phases, thus providing considerably superior tensile strength, and good flexibility due to high elongation and low flexural strength.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A polymer composition for an insulation layer of power cables having a morphology in which a second phase substance of polypropylene composite is dispersed in a first phase substance of polypropylene,
   wherein the polypropylene composite of the second phase substance has a morphology in which an at least partially cured elastomer is dispersed as a filler in a matrix of polypropylene, and
   wherein the polymer composition is prepared by blending the first phase substance with the second phase substance.

2. The polymer composition according to claim 1, wherein the polypropylene of the first phase substance is entirely (fully) mixed with the polypropylene of the second phase substance at the interface therebetween.

3. The polymer composition according to claim 1, wherein the elastomer of the second phase substance is an EPDM (ethylene propylene diene monomer) rubber.

4. The polymer composition according to claim 3, wherein the EPDM rubber of the elastomer is partially cured.

5. The polymer composition according to claim 3, wherein the EPDM rubber of the elastomer is fully cured.

6. A cable insulation layer comprising the polymer composition for an insulation layer of power cables according to claim 1.

7. A power cable comprising the cable insulation layer according to claim 6.

* * * * *